(12) United States Patent
Li et al.

(10) Patent No.: US 8,418,826 B2
(45) Date of Patent: Apr. 16, 2013

(54) LOCK PIN-TYPE AUTOMOBILE SYNCHRONIZER

(75) Inventors: Dakai Li, Shaanxi Province (CN); Zenggang Guo, Shaanxi Province (CN); Shunli Wang, Shaanxi Province (CN); Lin Yang, Shaanxi Province (CN)

(73) Assignee: Shaanxi Fast Gear Co., Ltd., Shaanxi Province (CN)

( * ) Notice: Subject to any disclaimer, the term of this patent is extended or adjusted under 35 U.S.C. 154(b) by 193 days.

(21) Appl. No.: 12/990,139

(22) PCT Filed: Oct. 24, 2008

(86) PCT No.: PCT/CN2008/072813
§ 371 (c)(1),
(2), (4) Date: Oct. 28, 2010

(87) PCT Pub. No.: WO2009/137974
PCT Pub. Date: Nov. 19, 2009

(65) Prior Publication Data
US 2011/0185846 A1    Aug. 4, 2011

(30) Foreign Application Priority Data
May 15, 2008 (CN) .............. 2008 2 0029114 U

(51) Int. Cl.
*F16D 13/30* (2006.01)
*F16H 3/38* (2006.01)

(52) U.S. Cl.
USPC ............... 192/53.331; 192/48.91; 74/339

(58) Field of Classification Search ........... 74/339, 74/340, 359, 362, 370, 372, 374; 192/53.331, 192/53.33, 53.332, 48.91
See application file for complete search history.

(56) References Cited

U.S. PATENT DOCUMENTS

| | | | |
|---|---|---|---|
| 2,546,746 A * | 3/1951 | Henning | 192/53.331 |
| 2,573,613 A * | 10/1951 | Schultze | 192/53.331 |
| 3,221,851 A * | 12/1965 | Vandervoort | 192/53.331 |
| 3,286,801 A * | 11/1966 | Wojcikowski | 192/53.331 |
| 3,365,039 A * | 1/1968 | Stott et al. | 192/53.331 |
| 4,162,001 A * | 7/1979 | Yant | 192/53.331 |
| 4,796,741 A * | 1/1989 | Loeffler | 192/53.331 |
| 5,069,079 A * | 12/1991 | Vandervoort | 74/339 |
| 5,607,037 A * | 3/1997 | Yarnell et al. | 192/53.331 |
| 5,738,195 A | 4/1998 | Gluys et al. | |
| 6,390,266 B1 | 5/2002 | Rose et al. | |
| 6,415,498 B1 | 7/2002 | Roberts | |
| 2002/0079183 A1* | 6/2002 | Smith | 192/53.31 |
| 2002/0189915 A1* | 12/2002 | Rose et al. | 192/53.332 |

FOREIGN PATENT DOCUMENTS

CN      200946635 Y      9/2007

* cited by examiner

*Primary Examiner* — Troy Chambers
*Assistant Examiner* — Valentin Craciun
(74) *Attorney, Agent, or Firm* — Frommer Lawrence & Haug LLP; Ronald R. Santucci

(57) ABSTRACT

A lock pin-type automobile synchronizer includes a higher gear conical ring (1) and a lower gear conical ring (4) which are arranged at the sides of a sliding gear sleeve (3). A higher gear lock pin (2) is fixed to one side of the higher gear conical ring (1). A lower gear lock pin (5, 6) is fixed to one side of the lower gear conical ring (4). A pin hole corresponding to the higher gear (2) lock pin and the lower gear lock pin (5, 6) is arranged on the sliding gear sleeve (3). The number of lower gear lock pins (5, 6) is higher than the number of higher gear lock pins (2).

2 Claims, 1 Drawing Sheet

LOCK PIN-TYPE AUTOMOBILE SYNCHRONIZER

This application is a 371 of PCT/CN2008/072813 filed on Oct. 24, 2008 and published on Nov. 19, 2009 under publication number WO 2009/137974 A which claims priority benefits from Chinese Patent Application No. 200820029114.9 filed May 15, 2008, the disclosure of which is hereby incorporated by reference.

The present application claims the benefit of priority to Chinese patent application No. 200820029114.9 titled "A LOCK PIN-TYPE AUTOMOBILE SYNCHRONIZER", filed with the Chinese State Intellectual Property Office on May 15, 2008. The entire disclosure thereof is incorporated herein by reference.

FIELD OF THE INVENTION

The present invention relates to a transmission having a main section and an auxiliary section for an automobile, in particular to a lock pin-type automobile synchronizer.

BACKGROUND OF THE INVENTION

The transmission having the main section and the auxiliary section is widely used in heavy-duty vehicles. A synchronizer is provided in the auxiliary section, and mostly adopts a lock pin-type synchronizer including a higher gear conical ring and a lower gear conical ring which are arranged at both sides of a sliding gear sleeve. A higher gear lock pin is fixed to one side of the higher gear conical ring. A lower gear lock pin is fixed to one side of the lower gear conical ring. Pin holes corresponding to the higher gear lock pin and the lower gear lock pin are arranged on the sliding gear sleeve. At present, in the conventional lock pin-type automobile synchronizer, the higher gear side components are configured to substantially have the same strength as the lower gear side components, that is, the higher gear lock pin has the same number and the completely or approximately same diameter as the lower gear lock pin. However, for the synchronizer in the auxiliary section, it will take a relatively long synchronizing time to engage the lower gear, that is, the synchronizer will be loaded for a long time when engaging the lower gear. Thus, compared with the higher gear side components, the associated lower gear side components have a shorter fatigue life, such that the lower gear lock pin tends to be ruptured or loosed untimely and thus the whole synchronizer becomes failure untimely.

SUMMARY OF THE INVENTION

The problem to be solved by the present invention is to provide a lock pin-type automobile synchronizer having a longer working life by improving the conventional lock pin-type automobile synchronizer.

The lock pin-type automobile synchronizer according to the present invention includes a higher gear conical ring and a lower gear conical ring which are arranged at both sides of a sliding gear sleeve respectively. Higher gear lock pins are fixed to the higher gear conical ring. Lower gear lock pins are fixed to the lower gear conical ring. Pin holes corresponding to the higher gear lock pins and the lower gear lock pins are arranged on the sliding gear sleeve. The number of lower gear lock pins is higher than the number of higher gear lock pins.

Generally, the number of the lower gear lock pins preferably is integer multiple of the number of the higher gear lock pins.

In order to avoid increasing the complexity and lowering the manufacture cost, the lower gear lock pins includes at least three long lower gear lock pins protruding into holes of the higher gear conical ring and pushed against the higher gear conical ring by a compression spring; and the lower gear lock pins further includes short lower gear lock pins protruding from a side surface of the lower gear conical ring, and a free end of each short lower gear lock pins is separated from the higher gear conical ring by an appropriate distance.

When the synchronizer is switched from a higher gear to a lower gear, all of the lower gear lock pins play a role of locking. When the synchronizer is switched from a lower gear to a higher gear, the higher gear lock pins play a role of locking.

Compared with the synchronizer in the prior art, the number of the lower gear lock pins is increased in the present invention. Thus, each of the lower gear lock pins is subject to a small force, and the fatigue life thereof is prolonged in working, which is adapted to the long synchronizing time for lower gear in actual working. As a result, the lower gear lock pins and thus the synchronizer according to the present invention have a more reasonable life design and a higher reliability. In the present invention, a part of the lower gear lock pins are designed as short lock pins which are unrelated to the higher gear conical ring. Therefore, it is unnecessary to modify the conventional structure of the higher gear conical ring, and thus the manufacture cost is reduced.

DETAILED DESCRIPTION OF THE INVENTION

Figure 1:
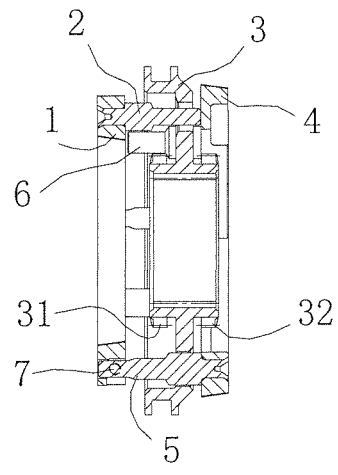
FIG. 1 is a structural view of the present invention which is a sectional view along line A-A in FIG. 2.
Figure 2:
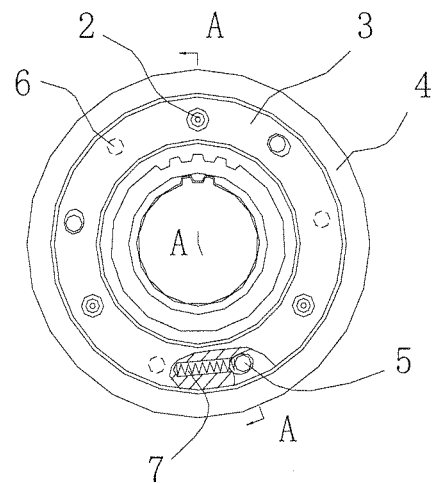
FIG. 2 is a right view of FIG. 1.
Figure 3:
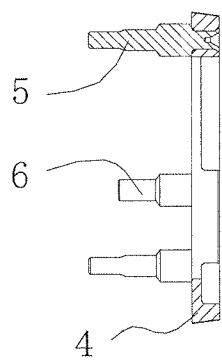
FIG. 3 is a view of the lower gear conical ring assembly in FIG. 1.

One embodiment of the present invention is shown in FIGS. 1, 2 and 3. The synchronizer includes a higher gear conical ring 1, higher gear lock pins 2, a sliding gear sleeve 3, a lower gear conical ring 4, lower gear lock pins 5, 6 and a compression spring 7. There are three higher gear lock pins 2 which are regularly riveted on the higher gear conical ring 1. There are six lower gear lock pins, i.e. three long lock pins and three short lock pins. Three long lock pins 5 are configured into a group and regularly riveted on the lower gear conical ring 4. The free end of each long lock pin 5 protrudes into a hole of the higher gear conical ring and supported by the compression spring 7 of the higher gear conical ring, in order to ensure a pre-lock (the structure of this part is the same as that of the conventional synchronizer). Three short lock pins 6 are configured into a group and regularly riveted on the lower gear conical ring 4, and the free end of each short lock pins 6 does not contact with the higher gear conical ring. The sliding gear sleeve 3 is provided with nine pin holes, three of which are used to receive the higher gear lock pins and the others of which are used to receive the lower gear lock pins.

Figure 4:
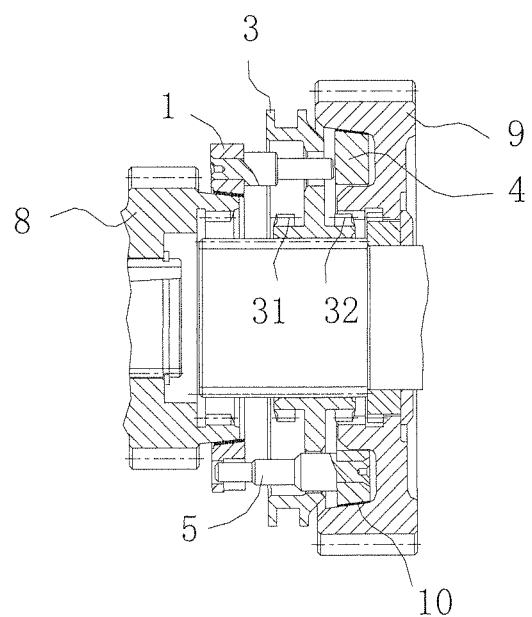
FIG. 4 is a view of the present invention in a state when engaging a lower gear.

As shown in FIG. 4, when the synchronizer is switched from a higher gear to a lower gear, the sliding gear sleeve 3 is moved rightward, and higher gear engaged teeth 31 on the sliding gear sleeve 3 are disengaged from a high gear wheel 8 and comes into a neutral position. Under the action of the compression spring 7, the lower gear lock pins 5, 6 abut against the taper surfaces of pin holes in the sliding gear sleeve 3 and come into a lock state. The sliding gear sleeve 3 pushes the lower gear lock pins 5, 6 to move rightward along with the lower gear conical ring 4. Then, the lower gear conical ring 4 tightly abuts against the taper surface 10 of a low gear wheel 9 and thus the friction is generated therebetween, thereby entering into a synchronizing course. The synchronizing course will end when the difference between the rotation speeds of the lower gear conical ring and the low gear wheel is zero. The sliding gear sleeve 3 is continuously moved rightward until the lower gear engaged teeth 32 are engaged with the low gear wheel 9, thereby the lower gear is engaged. The synchronizer may be switched from the lower gear to the higher gear on the basis of the same principle described above.

What is claimed is:

1. A lock pin automobile synchronizer comprising a higher gear conical ring and a lower gear conical ring which are arranged at both sides of a sliding gear sleeve respectively, higher gear lock pins are fixed to the higher gear conical ring, lower gear lock pins are fixed to the lower gear conical ring, pin holes corresponding to higher gear lock pins and lower gear lock pins are arranged on the sliding gear sleeve, wherein the number of the lower gear lock pins is higher than the number of the higher gear lock pins, and the lower gear lock pins comprises at least three long lower gear lock pins protruding into holes of the higher gear conical ring and pushed against the higher gear conical ring by a compression spring; and the lower gear lock pins further comprises short lower gear lock pins protruding from a side surface of the lower gear conical ring, and a free end of each short lower gear lock pins is separated from the higher gear conical ring by a distance.

2. The lock pin automobile synchronizer according to claim 1, wherein the number of the lower gear lock pins is integer multiple of the number of the higher gear lock pins.

* * * * *